US009272460B2

(12) United States Patent  
Matsuo et al.

(10) Patent No.: US 9,272,460 B2
(45) Date of Patent: Mar. 1, 2016

(54) METHOD OF PRODUCING POLARIZING FILM

(75) Inventors: Naoyuki Matsuo, Ibaraki (JP); Mayu Shimoda, Ibaraki (JP); Yuuki Nakano, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 145 days.

(21) Appl. No.: 13/704,910

(22) PCT Filed: May 30, 2011

(86) PCT No.: PCT/JP2011/062323
§ 371 (c)(1),
(2), (4) Date: Dec. 17, 2012

(87) PCT Pub. No.: WO2011/158637
PCT Pub. Date: Dec. 22, 2011

(65) Prior Publication Data
US 2013/0160935 A1    Jun. 27, 2013

(30) Foreign Application Priority Data

Jun. 17, 2010 (JP) ................. 2010-138133
Aug. 4, 2010 (JP) ................. 2010-175625
Apr. 5, 2011 (JP) ................. 2010-083524

(51) Int. Cl.
*B29C 65/16* (2006.01)
*B29C 55/02* (2006.01)
(Continued)

(52) U.S. Cl.
CPC .............. *B29C 55/02* (2013.01); *B29C 55/026* (2013.01); *B29C 65/1635* (2013.01);
(Continued)

(58) Field of Classification Search
CPC ................ B65H 2301/4622; B65H 2301/463; B29C 66/1122; B29C 66/1142; B29C 66/43; Y10T 156/1079
USPC ......................... 156/157, 502, 159, 504, 507
See application file for complete search history.

(56) References Cited

U.S. PATENT DOCUMENTS 8,138,449 B2    3/2012  Matsuo et al.
2003/0039837 A1*  2/2003  Koshida et al. ............ 428/411.1
(Continued)

FOREIGN PATENT DOCUMENTS

CN     1412580 A     4/2003
CN   101579922 A    11/2009
(Continued)

OTHER PUBLICATIONS

Office Action dated May 23, 2014, issued in corresponding Chinese Patent Application No. 201180029820.8 (6 pages).
(Continued)

*Primary Examiner* — Carson Gross
(74) *Attorney, Agent, or Firm* — Westerman, Hattori, Daniels & Adrian, LLP

(57) ABSTRACT

A method of producing a polarizing film having a high polarizing function. Provided is a method of producing a polarizing film, including the steps of: at least dyeing and stretching a first polyvinyl alcohol of two or more band-like polyvinyl alcohol films in the course of a traveling path while traveling the first polyvinyl alcohol film in a longitudinal direction, and bonding a tail end of the first polyvinyl alcohol resin film to a leading end of a second polyvinyl alcohol resin film to at least dye and stretch the first and second polyvinyl alcohol resin films continuously, wherein the first and second polyvinyl alcohol resin films are arranged with the tail end of the first polyvinyl alcohol resin film and the leading end of the second polyvinyl alcohol resin film being layered, and an interface portion thereof is laser welded to perform the bonding.

11 Claims, 8 Drawing Sheets

(51) Int. Cl.
  B29C 65/50 (2006.01)
  B29C 65/00 (2006.01)
  B65H 21/00 (2006.01)
  G02B 5/30 (2006.01)
  B29D 11/00 (2006.01)
  B29C 55/06 (2006.01)
  B29C 65/82 (2006.01)
  B29K 29/00 (2006.01)
  B32B 37/20 (2006.01)
  B32B 38/00 (2006.01)
  B29L 11/00 (2006.01)

(52) U.S. Cl.
  CPC ........ B29C 65/1683 (2013.01); B29C 65/5042 (2013.01); B29C 65/8253 (2013.01); B29C 66/1122 (2013.01); B29C 66/1142 (2013.01); B29C 66/344 (2013.01); B29C 66/43 (2013.01); B29C 66/71 (2013.01); B29C 66/7338 (2013.01); B29C 66/81267 (2013.01); B29C 66/8322 (2013.01); B29D 11/00644 (2013.01); B65H 21/00 (2013.01); G02B 5/3033 (2013.01); B29C 55/06 (2013.01); B29C 65/1616 (2013.01); B29C 65/1619 (2013.01); B29C 65/1654 (2013.01); B29C 65/1667 (2013.01); B29C 65/8215 (2013.01); B29K 2029/04 (2013.01); B29K 2995/0034 (2013.01); B29L 2011/00 (2013.01); B32B 37/206 (2013.01); B32B 38/164 (2013.01); B32B 2038/0028 (2013.01); B32B 2307/42 (2013.01)

(56) References Cited

U.S. PATENT DOCUMENTS

2004/0100708 A1    5/2004  Noda et al.
2004/0112519 A1    6/2004  Mori
2009/0283504 A1 *  11/2009 Matsuo et al. ........... 219/121.64

FOREIGN PATENT DOCUMENTS

DE        43 03 061 A1       8/1993
EP        2 119 529 A1      11/2009
JP         5-278112 A       10/1993
JP       2004-160665 A       6/2004
JP       2007-171897 A       7/2007
JP        2007171897 A    *  7/2007
JP       2009-274382 A      11/2009
JP         2010-8509 A       1/2010
JP       2010-125654 A       6/2010
KR    10-2009-0119684 A     11/2009

OTHER PUBLICATIONS

International Search Report for PCT/JP2011/062323, mailing date of Aug. 23, 2011.
International Preliminary Repport on Patentability (Forms PCT/IB/326) of International Application No. PCT/JP2011/062323 mailed Jan. 3, 2013 with forms PCT/IB/373, PCT/IB/338 and PCT/ISA/237.
Office Action dated Jun. 8, 2015, issued in counterpart Chinese Patent Application No. 201180029820.8 (7 pages).

* cited by examiner

METHOD OF PRODUCING POLARIZING FILM

TECHNICAL FIELD

The present invention relates to a method of producing a polarizing film in which while a band-like polyvinyl alcohol resin film is traveled in the longitudinal direction, the polyvinyl alcohol resin film is stretched in the longitudinal direction in the course of a traveling path to produce a polarizing film.

BACKGROUND ART

In the related art, optical films including polarizing films are used in image display apparatuses such as liquid crystal display apparatuses.

As a method of producing such a polarizing film, a process is used in which a polyvinyl alcohol resin film (raw film) is fed from a raw film roll produced by winding a band-like polyvinyl alcohol resin (PVA) film as a raw film into a roll; and the polyvinyl alcohol resin film is stretched by passing the film through an apparatus including a plurality of rollers for restricting the traveling path of the raw film and guiding the raw film and a variety of chemical solution baths. For example, a process is used in which the raw film is traveled in the longitudinal direction, and dipped into a swelling bath and a dyeing bath successively; then, the raw film is nipped by the rollers at two places of a leading portion and a tail portion of the raw film in the traveling direction, and a tension is applied therebetween to stretch the raw film.

In the method of producing such a polarizing film, every time when the raw film roll is replaced, a new raw film is wound around the rollers or the like, and set in the apparatus. This is very complicated and time-consuming. For this reason, the leading end of the raw film fed from the next raw film roll is bonded to the tail end of the previous raw film, and the two joined raw films are sequentially and continuously processed into a polarizing film.

As such a bonding method, in the related art, methods such as adhesive bonding methods using an adhesive tape, an adhesive or the like, sewing bonding methods using a rivet, a thread or the like, or heat melting bonding methods using a heat sealer or the like, are used.

Such methods, however, have problems below.

Problems in Adhesive Bonding Using an Adhesive Tape, an Adhesive or the Like

In the step of dipping the raw film in a swelling bath, a dyeing bath or the like, the component of the adhesive and the like are eluted into the chemical solution to contaminate the chemical solution. The contamination may cause adhesion of foreign substances to products. In addition, the adhesive dissolves in the chemical solution or swells due to a component in the chemical solution to reduce bonding strength. This may break the joint portion in the stretching step before the stretch ratio reaches a desired stretch ratio.

Problems in Sewing Bonding Using a Rivet, a Thread or the Like

In this method, holes for a rivet or a thread are formed in the raw film. For this reason, when a tension is applied to the joint portion, the joint portion may be broken from the holes.

When the number of holes is reduced and the holes are formed at a larger interval in order to prevent such breakage, application of a tension may easily cause wrinkles, leading to uneven stretching.

Problems in Heat Melting Bonding Using a Heat Sealer or the Like

As a bonding method that can solve the problems in the adhesive bonding and the sewing bonding, a bonding method using a heat sealer is known as shown in Patent Documents 1 and 2 below.

In this method, the chemical solution is less contaminated than in the case of the adhesive bonding, and no holes need to be formed unlike the case of the sewing bonding.

It is difficult, however, to heat only a narrow area with a heat sealer, and a relatively large area of a welded region is likely to be formed. The welded region and portions around the welded region tend to be modified by the heat applied during welding and become harder than other normal portion.

For this reason, when a tension is applied with the welded region being nipped during stretching, distortion is likely to be produced intensively at a boundary portion between the hardened portion and the other normal portion, and the region may be extremely stretched before the whole nipped portion of the raw film reaches a desired stretch ratio.

Accordingly, when the raw film is stretched at a high stretch ratio, the joint portion of the raw film may be broken.

CITATION LIST

Patent Document

Patent Document 1: Japanese Patent Laid-Open No. 2007-171897
Patent Document 2: Japanese Patent Laid-Open No. 2010-8509

SUMMARY OF INVENTION

Technical Problem

In order to give a high polarizing function to a polarizing film, usually, the raw film needs to be stretched at a stretch ratio of not less than 5.25 times. In the case where a raw film made of a polyvinyl alcohol resin is bonded by the bonding method in the related art as described above, the joint portion may not stand the stretch load of not less than 5.25 times, and be broken. For this reason, the stretch ratio is changed to less than 5.25 times while the joint portion passes through, thereby to avoid the breakage.

In the case where such a method for avoiding the breakage is selected, however, the stretch ratios on the upstream side and the downstream side of the joint portion are not a desired stretch ratio (not less than 5.25 times). For this reason, the stretched film cannot be used as a product, leading to loss of materials.

Thus, it is difficult to travel the joined raw films made of a polyvinyl alcohol resin while the raw films including their joint portion are continuously stretched at a stretch ratio of not less than 5.25 times. Moreover, no bonding method enabling such stretching and traveling of the raw film has been proposed.

Namely, the method of producing a polarizing film in the related art has problems such as difficulties to efficiently produce the polarizing film having a high polarizing function. Accordingly, an object of the present invention is to solve the problems.

Solution to Problem

In order to solve the problems, according to the present invention, there is provided a method of producing a polarizing film, including the steps of: at least dyeing and stretching a first polyvinyl alcohol of two or more band-like polyvinyl alcohol films in the course of a traveling path while traveling the first polyvinyl alcohol film in a longitudinal direction, and bonding a tail end of the first polyvinyl alcohol resin film to a leading end of a second polyvinyl alcohol resin film to at least dye and stretch the first and second polyvinyl alcohol resin films continuously, wherein the first and second polyvinyl alcohol resin films are arranged with the tail end of the first polyvinyl alcohol resin film and the leading end of the second polyvinyl alcohol resin film being layered, and an interface portion thereof is laser welded to perform the bonding.

Advantageous Effects of Invention

In the present invention, among two or more band-like polyvinyl alcohol films to be stretched, the tail end of the preceding first band-like polyvinyl alcohol resin film is bonded by laser welding to the leading end of the second polyvinyl alcohol resin film bonded thereto. For this reason, compared to the case of the adhesive bonding using an adhesive or the like, contamination of the chemical solution or reduction in bonding strength by the chemical solution can be suppressed.

Moreover, in the laser welding, a laser can selectively heat only an extremely narrow region. Accordingly, formation of a modified (hardened) region can be suppressed compared to the case of using a heat sealer that needs to heat the film entirely.

Accordingly, a joint portion can be formed in which intensive distortion is more difficult to occur during stretching than in the case of welding using a heat sealer.

This enables, for example, bonding of the raw films not broken in the stretching step at a stretch ratio of not less than 5.25 times. When the joint portion passes through, the raw films are stretched continuously without changing the stretching conditions, leading to improve work efficiency, productivity, and yield, and an effect of reducing material loss.

The laser welding of the polyvinyl alcohol resin film used in the polarizing film has not been found in the related art, and has been first attained in the present invention.

DESCRIPTION OF EMBODIMENTS

Figure 1:
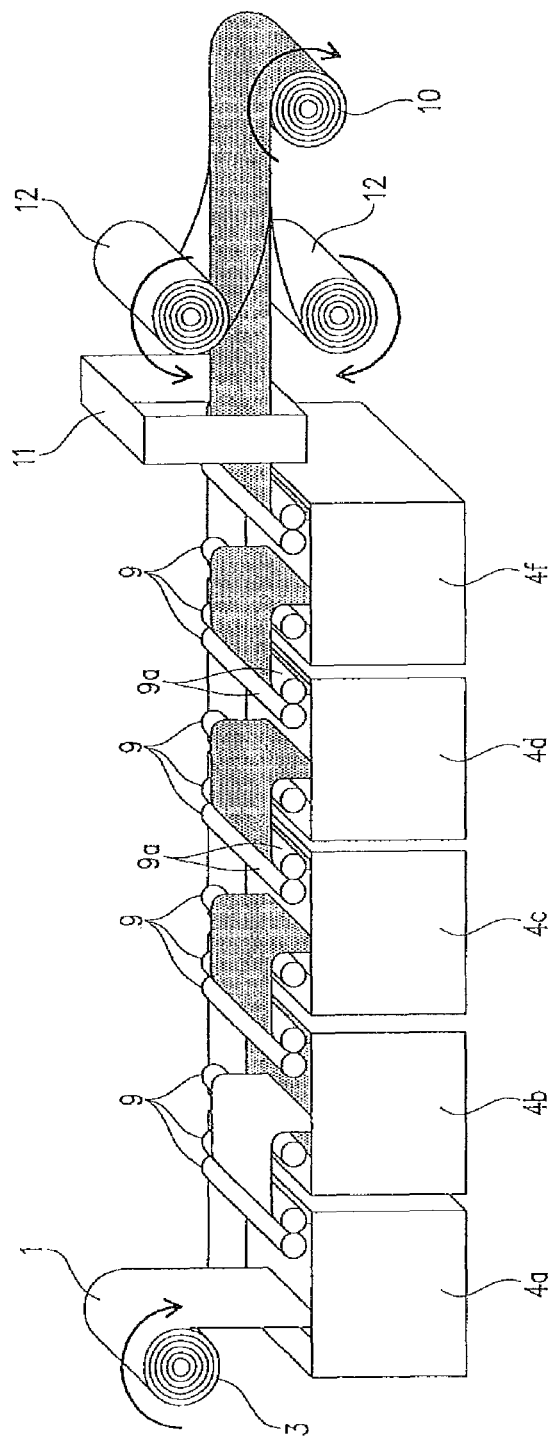
FIG. 1 is a schematic perspective view showing an apparatus used in a method of producing a polarizing film according to one embodiment.

Hereinafter, embodiments according to the present invention will be described.

First, a preferred stretching apparatus for implementing the method of producing a polarizing film according to the present embodiment will be described with reference to the drawings.

The stretching apparatus according to the present embodiment includes a raw film feeder 3 that feeds a raw film 1 from a raw film roll formed by winding a band-like polyvinyl alcohol resin film (hereinafter, referred to as a "raw film" or simply referred to as a "film") into a roll, a plurality of dipping baths 4 for dipping the fed raw film 1 into predetermined chemical solutions, a plurality of rollers 9 that restricts the traveling path of the raw film 1 so as to pass the raw film 1 through the inside of the dipping bath 4, a stretching unit that stretches the raw film 1 in the course of the traveling path, and a polarizing film winder 10 that winds, as a polarizing film, the film dipped in the plurality of dipping baths 4 and stretched into a roll.

Figure 2:
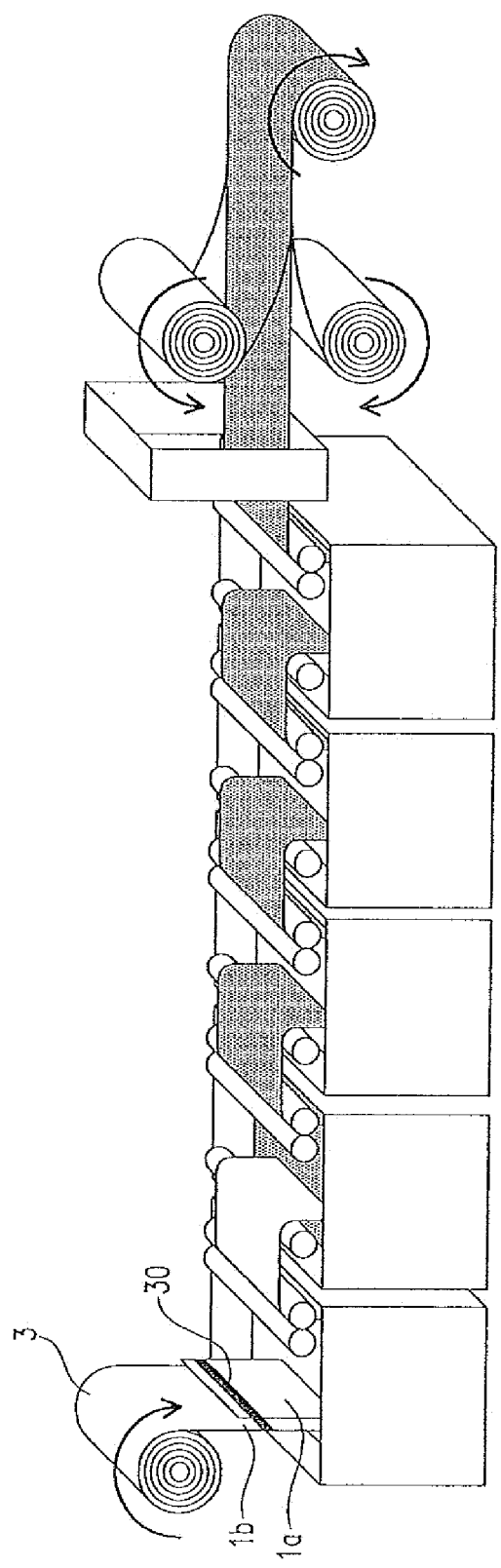
FIG. 2 is a schematic perspective view showing a manner in which raw films are bonded and fed to a polarizing film producing apparatus.

FIG. 1 and FIG. 2 are schematic perspective views showing preferred one embodiment of the stretching apparatus.

As shown in FIG. 1, as the plurality of dipping baths 4, the stretching apparatus includes five dipping baths 4, namely, from the side upstream of the traveling direction of the film, a swelling bath 4a containing a swelling solution and swelling the polyvinyl alcohol resin film, a dyeing bath 4b containing a dye solution and dyeing the swelled film, a crosslinking bath 4c containing a crosslinking agent solution and crosslinking molecular chains of the resin that forms the film, a stretching bath 4d for stretching the film inside of the bath, and a washing bath 4f containing a washing liquid and washing the film passed through the stretching bath 4d.

The stretching apparatus according to the present embodiment also includes a dryer 11 for drying the washing liquid adhering to the film, specifically a drying oven provided downstream of the washing bath 4f and upstream of the winder 10 in the traveling path of the film.

Further, the stretching apparatus according to the present embodiment includes a roll of a laminate film 12 such as a surface protective film (e.g., a triacetylcellulose film or a cyclo olefin polymer film) arranged on each of the front and rear surface sides of the film dried by the dryer 11. The stretching apparatus according to the present embodiment includes a laminating apparatus for laminating the laminate film 12 on each of the front and rear surfaces of the film after drying.

As the stretching unit, the so-called roll stretching unit 9a is used. Namely, several pairs of nip rollers 9a are arranged in the course of the traveling path, and configured to hold the film therebetween and feed the film to the side downstream of the traveling direction. The several pairs of nip rollers 9a are also configured such that the pair of nip rollers on the side downstream of the traveling direction has a circumferential speed higher than that of the pair of nip rollers on the side upstream of the traveling direction.

Further, the stretching apparatus is configured to stretch two or more raw films continuously, and includes an apparatus for bonding the tail end of a first raw film to a second raw film of the two or more raw films. Namely, the stretching apparatus includes a bonding apparatus (not shown in FIG. 2) for bonding a tail end 1a of the first raw film 1 to a leading end 1b of a new raw film (second raw film) to be fed into the traveling path following the raw film 1 by laser welding before the preceding tail end 1a of the first raw film 1 is fed into the restricted traveling path, specifically, fed into the dipping bath 4, as shown in FIG. 2.

In FIG. 2, the portion bonded by irradiation with a laser (welded portion) is shown as a black solid portion 30.

Next, a preferred bonding apparatus will be described with reference to FIG. 3.

Figure 3:
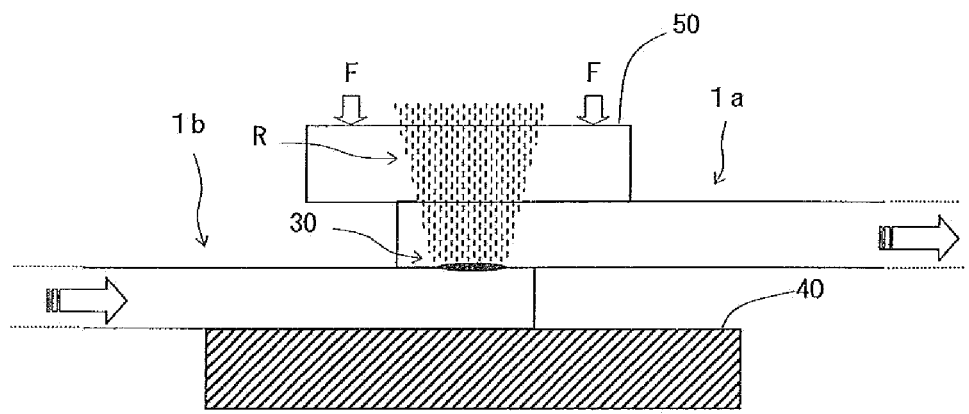
FIG. 3 is a schematic front view showing a mechanism of essential parts of a bonding apparatus for bonding raw films.

FIG. 3 is a schematic configuration view showing a bonding apparatus that bonds the raw films to each other by laser welding.

FIG. 3 is a front view of the bonding apparatus seen in the TD direction (transverse direction) from a lateral side of the raw films to be bonded.

As shown in FIG. 3, the bonding apparatus includes a stage 40 having a flat upper surface, a pressurizing member 50 arranged above the stage 40 movably in the vertical direction, and a laser light source (not shown) arranged above the pressurizing member 50. The bonding apparatus is configured such that the preceding tail end 1*a* of the first raw film 1 is layered on the leading end 1*b* of the new second raw film 1 to be bonded thereto on the stage 40, the layered portion is irradiated with laser light R from the laser light source while a pressure is applied to the layered portion by the pressurizing member 50; thereby, the interface portion between the tail end 1*a* and the leading end 1*b* is heated and molten to be welded. The pressurizing member 50 is formed with a transparent member highly transmissive to the laser light R.

The bonding apparatus can include a coating apparatus that applies a light absorbing agent to one (or both) of the surfaces of the tail end 1*a* and the leading end 1*b* contacting at the interface portion so as to enhance light absorbing properties of the interface portion between the tail end 1*a* and the leading end 1*b* to the laser light R and attain the welding efficiently.

The light absorbing agent used here is not particularly limited as long as the light absorbing agent absorbs the laser light R to generate heat. Carbon black, pigments, dyes, and the like can be used.

For example, phthalocyanine absorbing agents, naphthalocyanine absorbing agents, polymethine absorbing agents, diphenylmethane absorbing agents, triphenylmethane absorbing agents, quinone absorbing agents, azo absorbing agents, diimmonium salts, and the like can be used.

In the case where a laser light source emitting the laser light R having a wavelength of 800 nm to 1200 nm is used, a commercially available light absorbing agent as a trade name "Clearweld" made by Gentex Technology Corporation, U.S. can be used, for example.

These absorbing agents can be diluted with an organic solvent, and applied by the coating apparatus. As the coating apparatus, a standard coating apparatus such as a dispenser, an inkjet printer, a screen printer, a 2-fluid, 1-fluid, or ultrasonic spray, a stamper, and a coater can be used.

The kind of the laser light source used in the bonding apparatus is also not particularly limited. The laser light to be used has a function to be absorbed by the light absorbing agent provided on the surface(s) of one or both of the raw films at the interface between the old and new raw films in the layered portion of the old and new raw films to generate heat, and preferably has a wavelength highly absorbable by the light absorbing agent to be used.

Specifically, examples of the kind of the laser light include semiconductor lasers having a wavelength in the visible light range or infrared light range, fiber lasers, femtosecond lasers, picosecond lasers, solid-state lasers such as YAG lasers and gas lasers such as $CO_2$ lasers.

Among these, semiconductor lasers and fiber lasers are preferred because these lasers are inexpensive and easily provide an in-plane uniform laser beam.

In order to avoid decomposition of the raw film and promote melting of the raw film, CW lasers with a continuous wave are preferable compared to pulse lasers that give high energy instantaneously.

The output (power), beam size, and shape of the laser light, the number of irradiation with the laser light, and further the scan rate of the laser light, and the like may be properly optimized depending on a difference in optical properties such as light absorptivity of a target raw film and light absorbing agent and thermal properties such as the melting point and glass transition temperature (Tg) of the polymer that forms the raw film, or the like. In order to obtain strong bonding by efficiently fluidizing the polyvinyl alcohol resin in the portion irradiated with the laser, the power density of the laser light used for irradiation is preferably in the range of 200 $W/cm^2$ to 10,000 $W/cm^2$, more preferably in the range of 300 $W/cm^2$ to 5,000 $W/cm^2$, and particularly preferably in the range of 1,000 $W/cm^2$ to 3,000 $W/cm^2$.

The laser light source used in the bonding apparatus preferably can emit laser light at a spot diameter (irradiation width) of a predetermined size to the interface between the old and new raw films.

The irradiation spot diameter (irradiation width) is preferably not less than ⅓ of and not more than 3 times the width of the layered portion of the old and new raw films at a power that satisfies the irradiation laser power density.

When the irradiation spot diameter is less than ⅓ of the width of the layered portion, a non-bonded portion in the layered portion is large, and may flutter when the film is conveyed after bonding, inhibiting good transportability.

When the layered portion is irradiated with the laser having an irradiation spot diameter more than 3 times the width of the layered portion, no influence on bonding and stretching properties is found, but such irradiation is not preferable from the viewpoint of energy usage efficiency.

Preferably, the irradiation spot diameter is equal to or more than the width of the layered portion and not more than 2 times the width of the layered portion.

The width of the layered portion of the old and new raw films is preferably not less than 0.1 mm and less than 10.0 mm, and more preferably not less than 0.5 mm and less than 5 mm.

This is because it is difficult to layer and dispose the wide raw films repeatedly and precisely when the width of the layered portion is less than 0.1 mm. Moreover, when the width of the layered portion is not less than 10.0 mm, the layered portion needs to be irradiated with the laser light at a width of not less than 10.0 mm to prevent a non-bonded portion from being produced. For this reason, necessary energy is increased, and is not preferable from the viewpoint of energy saving.

In the layered portion of the old and new raw films, the width of the non-bonded portion is preferably less than 5 mm, and more preferably 0 mm (the entire layered portion is bonded). The width of the non-bonded portion is preferably less than 5 mm because the non-bonded portion may inhibit stretching of the film and lead to breakage of the film caused by concentration of stress when the width of the non-bonded portion is not less than 5 mm.

The integrated amount of irradiation of the laser light is preferably within the range of 5 $J/cm^2$ to 400 $J/cm^2$, more preferably within the range of 10 $J/cm^2$ to 300 $J/cm^2$, and particularly preferably within the range of 30 $J/cm^2$ to 150 $J/cm^2$.

Accordingly, a laser light source satisfying these conditions is preferably applied to the bonding apparatus.

In such irradiation with the laser light, the pressurizing member 50 applies pressure to the layered old and new raw films (tail end 1*a* of the old raw film and the leading end 1*b* of the new raw film) on the stage. A glass member having high transparency to the laser light to be used can be used for the pressurizing member 50.

A pressure applied during irradiation with the laser light is preferably in the range of 0.5 to 100 kgf/cm$^2$, and more preferably in the range of 10 to 70 kgf/cm$^2$.

Accordingly, as the pressurizing member 50 preferably used in the bonding apparatus, the shape of the glass member is not particularly limited as long as the member can apply a pressure in the range above. For example, a flat plate, cylindrical, or spherical glass member can be used.

The thickness of the glass member is not particularly limited. When the thickness is excessively thin, a pressure cannot be applied well due to distortion. When the thickness is excessively thick, usage efficiency of the laser light is reduced. For this reason, the thickness in the direction of the laser light transmitting is preferably not less than 3 mm and less than 30 mm, and more preferably not less than 5 mm and less than 20 mm.

Examples of a material for the pressurizing member 50 include quartz glass, non-alkali glass, TEMPAX, PYREX (registered trademark), Vycor, D263, OA10, and AF45.

In order to enhance usage efficiency of the laser light R, the glass member used for the pressurizing member preferably has high transparency to the wavelength of the laser light to be used, and has a light transmittance of preferably not less than 50%, and more preferably not less than 70%.

In the case where the pressurizing member 50 is formed with such a glass member, a cushioning layer having higher cushioning properties than those of the glass member can be formed in a portion contacting the polyvinyl alcohol resin film such that a pressure can be applied more uniformly to a larger area and a good bonding can be made over the whole area.

Namely, a pressurizing member 50 including a highly light-transmissive rubber sheet, a transparent resin sheet having cushioning properties or the like can be used. For example, a pressurizing member 50 can be used, in which the rear surface of the pressurizing member 50 is formed with the glass member, and the front surface thereof contacting the polyvinyl alcohol resin film is formed with a transparent rubber sheet.

The cushioning layer can be formed using, for example, rubber materials such as silicon rubbers and urethane rubbers and resin materials such as polyethylene.

The thickness of the cushioning layer is preferably not less than 50 μm and less than 5 mm, and more preferably not less than 1 mm and less than 3 mm.

At a thickness less than 50 μm, cushioning properties are poor. At a thickness not less than 5 mm, the cushioning layer may absorb or scatter the laser light to reduce energy of the laser light that reaches the contacting interface portion of the tail end 1a and the leading end 1b.

The cushioning layer preferably has a light transmittance of not less than 30%, and more preferably not less than 50% to the wavelength of the laser light to be used.

Further, in order to easily peel off the bonded raw film after the laser welding from the cushioning layer, a film material having no stickiness and not impairing cushioning properties can be disposed on the surface of the cushioning layer. Examples of such a film material include polycarbonate, polyethylene terephthalate, norborneneresin, cycloolefinpolymer, polymethylmethacrylate, polyimide, and triacetylcellulose.

The cushioning layer can be formed on a portion contacting the polyvinyl alcohol resin film on the stage 40.

The bonded portion formed by the laser welding is preferably disposed inclined to at least one of the transverse directions of the old and new raw films. Namely, the inclination angle of the bonded portion to at least one of the transverse directions of the old and new raw films is preferably more than 0°. At an inclination angle of the bonded portion more than 0°, concentration of stress to the bonded portion during stretching can be relaxed. As the inclination angle is larger, the concentration of stress during stretching can be more relaxed. Meanwhile, at an inclination angle of not less than 50°, the size of the bonding apparatus may be larger, or the time needed for bonding work may be longer. Accordingly, for example, considering this, the inclination angle of the bonded portion is preferably more than 0° and less than 50° to at least one of the transverse directions of the old and new raw films.

Examples of the arrangement of the bonded portion inclined to at least one of the transverse directions of the old and new raw films include an arrangement in which the transverse directions of the old and new raw films are arranged parallel to each other (the inclination angle of both the raw films in the transverse direction is 0°), and the bonded portion is arranged inclined to the transverse directions of both the raw films. Examples thereof also include an arrangement in which in the case where the transverse directions of the old and new raw films are arranged not parallel to each other (the inclination angle of both the raw films in the transverse direction is more than 0°), the bonded portion is parallel to one of the transverse directions of the raw films or the bonded portion is arranged inclined to both of the transverse directions of the raw films.

In the method of producing a polarizing film according to the present embodiment, the bonding apparatus is preferably configured such that the laser welding can be performed along the layered portion of the layered old and new raw films to form a linear welded portion. For example, preferably, the bonding apparatus includes a mechanism to scan along the layered portion with a spot beam converged into a desired beam size by a converging lens, a mechanism to shape a linear laser beam using optical member such as a cylindrical lens and a diffractive optical element and irradiate the layered portion of the raw films with the laser beam, and further a mechanism to have a plurality of laser light sources arranged along the layered portion, and melt and thermal bond the layered portion in batch without scan by simultaneous irradiation with the laser light sources. The shape of the laser light beam emitted in such a manner may be circular or linear. More preferably, the shape is linear. Thereby, a higher power density can be obtained.

Although the detail description will be omitted, the bonding apparatus can use various mechanisms used in ordinary laser welding apparatuses and peripheral apparatuses thereof.

Next, a process for producing a polarizing film using the stretching apparatus including such a bonding apparatus will be described.

The method of producing a polarizing film according to the present embodiment is a method of producing a polarizing film, comprising the steps of: at least dyeing and stretching a first polyvinyl alcohol of two or more band-like polyvinyl alcohol films in the course of a traveling path while traveling the first polyvinyl alcohol film in a longitudinal direction, and bonding a tail end of the first polyvinyl alcohol resin film to a leading end of a second polyvinyl alcohol resin film to at least dye and stretch the first and second polyvinyl alcohol resin films continuously, wherein the first and second polyvinyl alcohol resin films are arranged with the tail end of the first polyvinyl alcohol resin film and the leading end of the second polyvinyl alcohol resin film being layered, and an interface portion thereof is laser welded to perform the bonding.

More specifically, in the method of producing a polarizing film according to the present embodiment, the following steps are performed: a swelling step of dipping the raw film into the swelling bath 4a to swell the raw film, a dyeing step of dipping the swelled film into the dyeing bath 4b to dye the raw film, a crosslinking step of dipping the dyed film into the crosslinking bath 4c to crosslink molecular chains of the resin that forms the film, and a stretching step of stretching the film after the crosslinking step inside of the stretching bath 4d.

Namely, in the method of producing a polarizing film according to the present embodiment, the film is stretched in each of the swelling bath 4a to the stretching bath 4d so as to have a final target stretch ratio.

In the method of producing a polarizing film according to the present embodiment, a washing step of washing the film after the stretching step, a drying step of drying the washed film with the dryer 11, and a laminating step of laminating a surface protective film on the film after drying are performed.

In the method of producing a polarizing film according to the present embodiment, one raw film roll is set in the raw film feeder 3. The raw film is continuously fed from the raw film feeder 3, and subjected to the steps in the course of the traveling path. Then, a product finally subjected to the laminating step (polarizing film) is subjected to a winding step of winding the product into a roll in the polarizing film winder 10. The bonding of the films is separately performed as follows: a plurality of raw film rolls is prepared, and before the first raw film roll thereof is run out, a new second raw film is fed from a new second raw film roll; the leading end 1b of the new raw film is bonded to the tail end 1a of the preceding first raw film roll.

Thereby, the raw film is continuously fed from the new raw film roll to the stretching apparatus, and is at least dyed and stretched to continuously produce the polarizing film.

As the raw film (band-like polyvinyl alcohol resin film) used in the steps above, the followings can be used.

As the raw film used for the method of producing a polarizing film according to the present embodiment, a film formed of a polyvinyl alcohol polymer resin material used as the raw material for the polarizing film can be used. Specifically, polyvinyl alcohol films, partially saponified polyvinyl alcohol films, dehydrated polyvinyl alcohol films or the like can be used, for example.

Usually, these raw films are used in a state of a raw film roll in which the film is wound into a roll as described above.

The polymerization degree of the polymer as a material for forming the polyvinyl alcohol resin film is usually 500 to 10,000, and preferably in the range of 1,000 to 6,000, and more preferably in the range of 1,400 to 4,000.

In the case of the partially saponified polyvinyl alcohol film, the saponification degree is preferably not less than 75 mol %, and more preferably not less than 98 mol %, and more preferably in the range of 98.3 to 99.8 mol % from the viewpoint of solubility in water, for example.

As the polyvinyl alcohol resin film, those formed by any method of a casting method of casting a raw solution having materials dissolved in water or an organic solvent to form a film, a casting method, an extrusion method, and the like can be properly used.

The phase difference value of the raw film is preferably 5 nm to 100 nm.

In order to obtain an in-plane uniform polarizing film, fluctuation in the phase difference of the polyvinyl alcohol resin film in-plane is preferably as small as possible, and fluctuation in the in-plane phase difference of the polyvinyl alcohol resin film as the raw film is preferably not more than 10 nm and more preferably not more than 5 nm at a measurement wavelength of 1000 nm.

As the state of moisture absorption during laser bonding, the moisture absorbing rate is preferably 2% by mass to 15% by mass, and more preferably 4% by mass to 10% by mass.

When the raw film before bonding has a moisture absorbing rate of not less than 15% by mass, bubbles are likely to be produced in the heated and molten portion during the laser welding due to vaporization of water, and may cause poor bonding.

Conversely, in the case where the moisture absorbing rate is less than 2% by mass, fluidity of the resin may be reduced in the portion of the raw film heated by the laser, leading to reduction in bonding efficiency.

Thus, the raw film used in bonding preferably has a moisture absorbing rate within the range like the above.

The moisture absorbing rate is determined by comparing the masses of the polyvinyl alcohol resin film before and after drying. For example, the moisture absorbing rate can be determined by heating the polyvinyl alcohol resin film at 83° C. for 1 hour, and dividing the heating loss by the mass of the polyvinyl alcohol resin film before heating.

Next, each of the steps for stretching the raw film by the stretching apparatus to process the raw film into a polarizing film will be described.

(Swelling Step)

In the step, for example, the raw film fed from the raw film feeder 3 is guided by the rollers 9 to the swelling bath 4a filled with water while the traveling rate is kept constant, and dipped into water.

Thereby, the raw film is washed with water, and dirt on the surface of the raw film and a blocking preventing agent can be washed off. Moreover, by swelling the raw film with water, an effect of preventing unevenness such as dyeing unevenness can be expected.

Besides water, glycerin or potassium iodide may be properly added to the swelling solution in the swelling bath 4a. In the case where these are added, the concentration of glycerin is preferably not more than 5% by mass, and the concentration of potassium iodide is preferably not more than 10% by mass.

The temperature of the swelling solution is preferably in the range of 20 to 45° C., and more preferably 25 to 40° C.

The dipping time to dip the raw film into the swelling solution is preferably for 2 to 180 seconds, and more preferably for 10 to 150 seconds, and particularly preferably for 30 to 120 seconds.

Moreover, the polyvinyl alcohol resin film may be stretched in the longitudinal direction inside the swelling bath. At this time, the stretch ratio including extension by swelling is preferably approximately 1.1 to 3.5 times.

(Dyeing Step)

The film subjected to the swelling step is dipped into the dye solution contained in the dyeing bath 4b by the rollers 9 in the same way as that in the swelling step to perform the dyeing step.

For example, the polyvinyl alcohol resin film subjected to the swelling step is dipped into a dye solution containing a dichroic substance such as iodine to adsorb the dichroic substance to the film. Using such a process, the dyeing step can be performed.

As the dichroic substance, known substances can be used. Examples of those include iodine and organic dyes.

As the organic dyes, Red BR, Red LR, Red R, Pink LB, Rubine BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, Fast Black, and the like can be used, for example.

These dichroic substances may be used singly, or may be used in combinations of two or more.

In the case where the organic dye is used, for example, the dichroic substances are preferably used in combinations of two or more from the viewpoint of neutralization of the visible light region.

Specific examples thereof include a combination of Congo Red and Supra Blue G, a combination of Supra Orange GL and Direct Sky Blue, or a combination of Direct Sky Blue and Fast Black.

As the dye solution in the dyeing bath, a solution prepared by dissolving the dichroic substance in a solvent can be used.

As the solvent, water can be usually used. An organic solvent having compatibility with water may be further added to water and used.

The concentration of the dichroic substance in the dye solution is preferably in the range of 0.010 to 10% by mass, preferably in the range of 0.020 to 7% by mass, and particularly preferably 0.025 to 5% by mass.

In the case where iodine is used as the dichroic substance, dyeing efficiency can be further improved. Accordingly, iodides are preferably further added.

Examples of iodides include potassium iodide, lithium iodide, sodium iodide, zinc iodide, aluminum iodide, lead iodide, copper iodide, barium iodide, calcium iodide, tin iodide, and titanium iodide.

The proportion of these iodides to be added is preferably 0.010 to 10% by mass, and more preferably 0.10 to 5% by mass in the dyeing bath.

Among these, potassium iodide is preferably added. The proportion (mass ratio) of iodine to potassium iodide is preferably in the range of 1:5 to 1:100, more preferably in the range of 1:6 to 1:80, and particularly preferably in the range of 1:7 to 1:70.

The dipping time to dip the film into the dyeing bath is not particularly limited. The dipping time is preferably in the range of 0.5 to 20 minutes, and more preferably in the range of 1 to 10 minutes. The temperature of the dyeing bath is preferably in the range of 5 to 42° C., and more preferably in the range of 10 to 35° C.

Moreover, the film may be stretched in the longitudinal direction inside the dyeing bath. The total accumulated stretch ratio at this time is preferably approximately 1.1 to 4.0 times.

As the dyeing step, other than the method of dipping the film into the dyeing bath, a method of applying or spraying an aqueous solution containing the dichroic substance to the polymer film may be used, for example.

In the present invention, without performing the dyeing step, a film formed of a polymer raw material pre-mixed with the dichroic substance may be used as the raw film to be used.

(Crosslinking Step)

Next, the film is introduced into the crosslinking bath 4c containing the crosslinking agent solution, and dipped into the crosslinking agent solution to perform the crosslinking step.

As the crosslinking agent, known substances can be used. For example, boron compounds such as boric acid and borax, glyoxal, glutaraldehyde, and the like can be used.

These may be used singly, or may be used in combinations of two or more.

In the case where these are used in combinations of two or more, for example, a combination of boric acid and borax is preferable. The proportion (molar ratio) of these to be added is preferably in the range of 4:6 to 9:1, more preferably in the range of 5.5:4.5 to 7:3, and most preferably 6:4.

As the crosslinking agent solution in the crosslinking bath, those prepared by dissolving the crosslinking agent in a solvent can be used.

As the solvent, water can be used, for example. Further, an organic solvent having compatibility with water may be used with water. The concentration of the crosslinking agent in the crosslinking agent solution is not particularly limited. The concentration is preferably in the range of 1 to 10% by mass, and more preferably 2 to 6% by mass.

In order to give in-plane uniform properties to the polarizing film, an iodide may be added to the crosslinking agent solution in the crosslinking bath.

Examples of the iodide include potassium iodide, lithium iodide, sodium iodide, zinc iodide, aluminum iodide, lead iodide, copper iodide, barium iodide, calcium iodide, tin iodide, and titanium iodide. In the case where these are added, the content of the iodide is preferably 0.05 to 15% by mass, and more preferably 0.5 to 8% by mass.

As a combination of the crosslinking agent and an iodide, a combination of boric acid and potassium iodide is preferable. The proportion (mass ratio) of boric acid to potassium iodide is preferably in the range of 1:0.1 to 1:3.5, and more preferably in the range of 1:0.5 to 1:2.5.

The temperature of the crosslinking agent solution in the crosslinking bath is usually preferably in the range of 20 to 70° C. The dipping time of the polyvinyl alcohol resin film is usually any time in the range of 1 second to 15 minutes, and preferably 5 seconds to 10 minutes.

In the crosslinking step, the film may be stretched in the longitudinal direction in the crosslinking bath. At this time, the total accumulated stretch ratio is preferably approximately 1.1 to 5.0 times.

As the crosslinking step, similarly to the dyeing step, a method of applying or spraying a solution containing the crosslinking agent may be used instead of the method of dipping the film into the crosslinking agent solution to perform the crosslinking step.

(Stretching Step)

The stretching step is a step of stretching the dyed and crosslinked polyvinyl alcohol resin film in the longitudinal direction so as to have the total accumulated stretch ratio of 2 to 8 times, for example. In the wet stretching method, the film is stretched by applying tension to the film in the longitudinal direction while the film is dipped in the solution contained in the stretching bath.

The solution contained in the stretching bath is not particularly limited. For example, a solution to which a variety of metal salts, an iodine, boron, or zinc compound is added can be used.

As the solvent for the solution, water, ethanol, or a variety of organic solvents can be properly used.

Among these, a solution to which approximately 2 to 18% by mass of boric acid and/or approximately 2 to 18% by mass of potassium iodide is added is preferably used.

In the case where boric acid and potassium iodide are used at the same time, the proportion (mass ratio) of these to be used is approximately 1:0.1 to 1:4, and more preferably approximately 1:0.5 to 1:3.

The temperature of the solution in the stretching bath is, for example, preferably in the range of 40 to 67° C., and more preferably 50 to 62° C.

(Washing Step)

The washing step is a step of passing the film through a washing bath containing a washing liquid such as water to wash unnecessary residues adhering to the film in the previous step such as boric acid, for example.

An iodide is preferably added to water. For example, sodium iodide or potassium iodide is preferably added.

In the case where potassium iodide is added to water in the washing bath, the concentration is usually 0.1 to 10% by mass, and preferably 3 to 8% by mass.

Further, the temperature of the washing liquid is preferably 10 to 60° C., and more preferably 15 to 40° C.

The number of washing, namely, the number of repetition to dip the film into the washing liquid and pull out the film from the washing liquid is not particularly limited. The washing may be performed several times. Different additives at different concentrations may be added in water in a plurality of washing baths, and the film may be subjected to the washing step by passing the film through these washing baths.

When the film is pulled out from the dipping bath in each step, in order to prevent running of the solution, excessive water may be removed using a known solution draining roll such as a pinch roll, or a method of scraping off the solution with an air knife, or the like.

(Drying Step)

The film washed in the washing step is introduced into the dryer 11, and properly dried by an optimal method such as natural drying, air drying, and heat drying to perform the drying step.

Among these, in the case where the drying step by heat drying is performed, the heat drying conditions are preferably the heating temperature of approximately 20 to 80° C. and the drying time of approximately 1 to 10 minutes.

Further, the drying temperature is preferably kept as low as possible irrespective of the method in order to prevent deterioration of the film.

The drying temperature is more preferably not more than 60° C., and particularly preferably not more than 45° C.

(Laminating Step) and (Winding Step)

In the present embodiment, by performing the winding step of winding the film subjected to the steps above by the winding roller, a polarizing film wound into a roll can be obtained.

In the present embodiment, the winding step may be performed after the laminating step of properly laminating a surface protective film or the like on one or both of the surfaces of the polarizing film dried in the drying step is performed.

The final total stretch ratio of the thus-produced polarizing film is preferably any stretch ratio in the range of 5.5 to 8.0 times, and more preferably any stretch ratio in the range of 6.0 to 7.0 times to the raw film.

The above stretch ratio is preferable because it is difficult to obtain a polarizing film having high polarizing properties when the final total stretch ratio is less than 5.5 times, and the film may be broken when the final total stretch ratio is more than 8.0 times.

(Bonding Step)

As above, in the present embodiment, before all of one raw film roll is fed to the stretching apparatus, the polyvinyl alcohol resin film (raw film) is further fed from the next raw film roll, and the bonding step of bonding the leading end 1b of the new raw film to the tail end 1a of the raw film roll subjected to each of the steps in the stretching apparatus is performed.

Thus, the preceding tail end of the first raw film is bonded to the leading end of the next raw film by a laser bonding method. This can provide bonding of the films in which the film is not broken even at a stretch ratio of not less than 5.5 times, for example, needed to give a high polarizing function. Moreover, when the bonded portion is passed, the second raw film can be subjected to the stretching step without changing the stretching conditions, producing the polarizing film efficiently.

Namely, the first raw film and the second raw film can be continuously fed to the stretching apparatus without changing the stretching conditions to improve work efficiency, productivity, and yield and obtain the effect of reducing material loss.

The bonding step can be performed in parallel with the steps of swelling, dyeing, crosslinking, and stretching the first raw film on the side of a rear stage of these steps, not after these steps are completely finished.

For example, using a stretching apparatus having an accumulator provided between the bonding apparatus and the swelling bath 4a, the first raw film roll is fed via the accumulator to the swelling bath 4a. When the tail end portion of the first raw film roll is about to be fed, the raw film accumulated in the accumulator is fed to the side of the swelling bath 4a while the tail end is stopped. While the first raw film is at least dyed and stretched in this state, the leading end of the new raw film roll can be bonded to the tail end by the laser welding.

The bonding step can be performed as follows: for example, the tail end of the first polyvinyl alcohol resin film not dyed and stretched is arranged to be layered on the leading end of the second band-like polyvinyl alcohol resin film, and the interface portion between the layered tail end and leading end is bonded by the laser welding. The light absorbing agent is applied onto one or both of the surfaces of the tail end 1a of the preceding film and the leading end 1b of the new film. The old and new raw films are arranged to be layered on the stage 40 such that the width of the layered portion is not less than 0.1 mm and less than 10.0 mm. While a pressure is applied to the layered portion by the pressurizing member 50, the layered portion is irradiated with the laser light to melt the resins of the old and new raw films in the film interface and form the welded portion 30.

By welding using the laser light in this manner, an area thermally modified can be reduced compared to the case of welding using a heat sealer. As a result, a joint portion in which distortion is difficult to concentrate during stretching can be formed.

This will be specifically described. For example, suppose that a raw film having a large thermally modified (hardened) area formed in the joint portion by bonding using a heat sealer is fed to the stretching apparatus, the temperatures of the swelling bath 4a, the dyeing bath 4b, and the crosslinking bath 4c are, for example, around 30° C., and the total stretch ratio in the crosslinking bath 4c is set to approximately 5.0 times. When the film is stretched in this state, the thermally modified area is hardly stretched. As a result, a region having large distortion before and after the thermally modified area is formed.

The joint portion is broken when the joint portion is further stretched in the stretching bath 4d.

Meanwhile, in the present embodiment, the thermally modified area is smaller than that in the case where the layered portion is welded using a heat sealer, reducing concentration of distortion.

In addition, the small thermally modified area is easy to swell in the chemical solutions contained in the respective baths.

Namely, the small thermally modified area can be softened, further preventing concentration of distortion.

For example, in the case where the temperatures of the swelling bath 4a, the dyeing bath 4b, and the crosslinking bath 4c are around 30° C., the softening effect by swelling is less expected. Meanwhile, when the temperature of the stretching bath is 50 to 62° C., the swelling of the thermally modified area can progress to stretch the thermally modified area itself.

Namely, stretching properties of a region not influenced by heat by the welding can be made closer to those of the welded portion. Thereby, the film can be stretched at a high stretch ratio while the problems such as breakage are suppressed.

For example, the entire film including the joint portion of the first raw film and the second raw film can be stretched at a stretch ratio of not less than 5 times.

From the viewpoint of attaining a high stretch ratio that cannot be attained by a heat sealer even in the joint portion to provide remarkable effects of the present invention, the entire film including the joint portion is stretched preferably at a stretch ratio of not less than 5.25 times, and particularly preferably not less than 5.5 times.

The joint portion welded using a heat sealer has a large thermally modified area. For this reason, softening by swelling progresses mildly. Even when the film is stretched under the same temperature condition, the joint portion is easily broken.

Thus, in the method of producing a polarizing film according to the present embodiment, a joint portion difficult to be broken by stretching can be formed.

Further, the joint portion and the non-joint portion are stretched to the same extent in the traveling direction of the raw film. Accordingly, the joint portion has a relatively small thickness. Thereby, when the polarizing film is wound into a roll by the polarizing film winder 10, occurrence of a dent produced in a portion layering on the joint portion in the wound polarizing film can be reduced. From the viewpoint of enabling such reduction, the thickness of the joint portion after stretching is preferably less than 3 times, and more preferably less than 2.5 times the thickness of the non-joint portion after stretching.

Figure 4A:
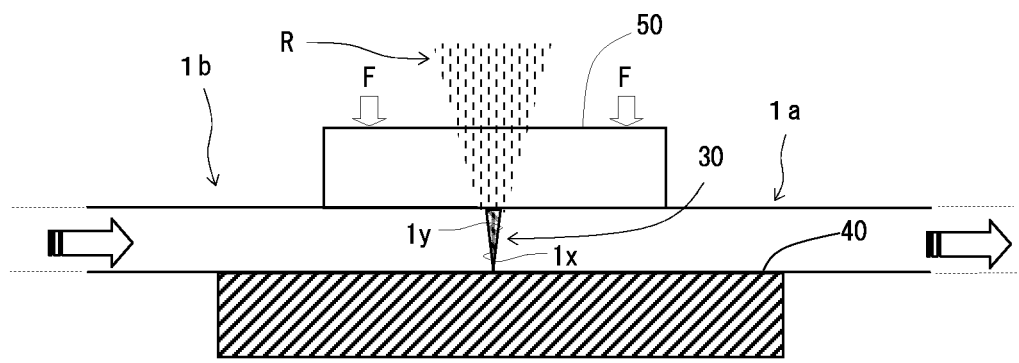
FIG. 4 is a front view showing a joint portion of raw films formed by a method of producing a polarizing film according other embodiment.

In the present embodiment, the first raw film and the second raw film can be easily welded only one time by irradiation with the laser. From such a viewpoint, an example has been shown in which the tail end of the first raw film and the leading end of the second raw film are layered, and the layered portion is irradiated with the laser to weld the interface portion at which the tail end and the leading end contact each other. From the viewpoint of forming a joint portion having a small thermally modified area and easy to swell by the chemical solution, as shown in FIG. 4(a), for example, the film end surface 1x of the tail end 1a of the first raw film faces the film end surface 1y of the leading end 1b of the second raw film to abut the first raw film and the second raw film. The abutted portion is irradiated with the laser to weld the film end surfaces together and form the welded portion 30. The case of bonding the first raw film to the second raw film in this way is also within the scope intended by the present invention.

Figure 4B:
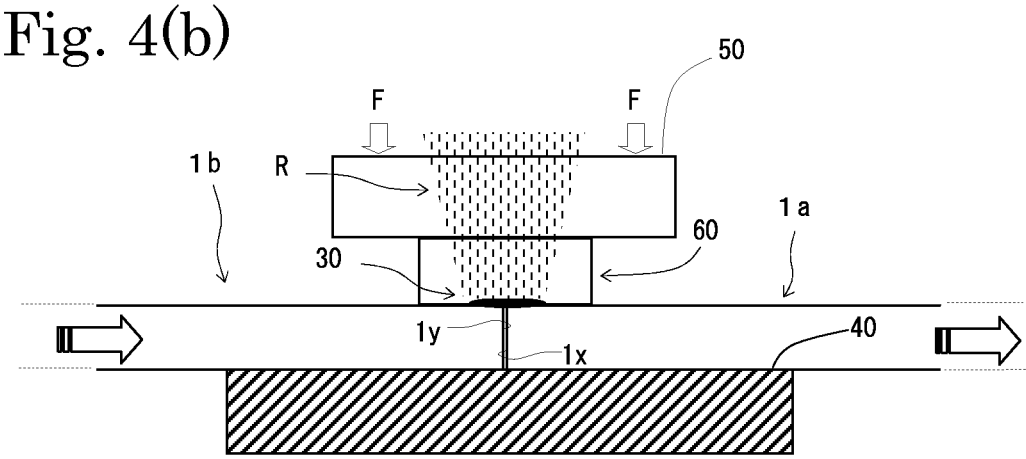

Further, as shown in FIG. 4(b), a narrow polyvinyl alcohol resin film having the same width as that of the raw film is used as a bonding member 60 for bonding the first raw film to the second raw film. As above, the first raw film and the second raw film are arranged to be abutted facing the film end surfaces thereof each other. The abutted portion is covered with the bonding member 60, and the interface portion at which the bonding member 60 contacts the tail end 1a of the first raw film is welded, and the interface portion at which the bonding member 60 contacts the leading end 1b of the second raw film is welded. Such a case is also within the scope intended by the present invention.

The thickness of the polarizing film produced according to the production process according to the present embodiment is not particularly limited, and is preferably 5 to 40 μm.

At a thickness of not less than 5 μm, mechanical strength is not reduced. At a thickness of not more than 40 μm, optical properties are not reduced. A thin profile of the image display apparatus can be attained when the polarizing film is used in the image display apparatus.

The polarizing film produced according to the present embodiment can be used as a polarizing film lamented on a liquid crystal cell substrate or the like in liquid crystal display apparatuses or the like. Other than the liquid crystal display apparatuses, the polarizing film can be used as a polarizing film in a variety of image display apparatuses such as electroluminescence display apparatuses, plasma displays, and field emission displays.

In practical use, a variety of optical layers can be laminated on both or one of the surfaces of the polarizing film to form an optical film, or the polarizing film can be subjected to a variety of surface treatments. Thus, the polarizing film can be used in image display apparatuses such as liquid crystal display apparatuses.

The optical layer is not particularly limited as long as required optical properties are satisfied. For example, films used for formation of an image display apparatus such as a transparent protective layer for protecting the polarizing film, an alignment liquid crystal layer for visual compensation or the like, an adhesive layer for laminating other film, a polarization conversion element, a reflector, a semi-transparent plate, a phase difference plate (including a ½ or ¼ wavelength plate (λ plate)), a visual compensation film, and a brightness improving film can be used.

Examples of surface treatments can include a hard coat treatment, an anti-reflective treatment, and surface treatments for prevention of sticking, scattering, or glare.

The method of producing a polarizing film according to the present embodiment is as described above. The present invention will not be limited to the present embodiment, and can be properly designed and modified within the scope intended by the present invention.

EXAMPLES

Next, using Example, the present invention will be described more in detail, but the present invention will not be limited to these.
(Evaluation 1)
(Basic Conditions)

raw film: polyvinyl alcohol resin (PVA) film (made by Kuraray Co., Ltd., thickness of 75 μm, width of 30 mm, moisture absorbing rate of 6%)

the width of the layered portion: 1.5 mm heat melting bonding method: laser laser: semiconductor laser (wavelength of 940 nm, power of 70 W, spot diameter of 2 mmφ, power density of 2,228 W/cm$^2$, scan rate of 50 mm/sec, integrated amount of irradiation of 89 J/cm$^2$, top hat beam)

light absorbing agent: trade name "Clearweld LD120C" (made by Gentex Technology Corporation, U.S., solvent of acetone), applied onto the upper surface of the raw film arranged on the lower side at a width of 5.0 mm and 10 mL/mm$^2$ pressurizing member: quartz glass plate (thickness of 10 mm)

pressurizing condition: pressed against the layered portion of the raw films at a load of 50 kgf/cm$^2$ inclination angle of old and new raw films: 0° inclination angle of the bonded portion of the old and new raw films in the transverse direction: 0°

Example 1

Under the basic conditions, two raw films were bonded, 50 mm of the bonded film extending between the upstream and downstream sides of the joint portion was cut out, and a polarizing film was produced in batch. As a result, the joint portion was not broken under the stretching condition of the total accumulated stretch ratio of 6.0 times.

Figure 5:
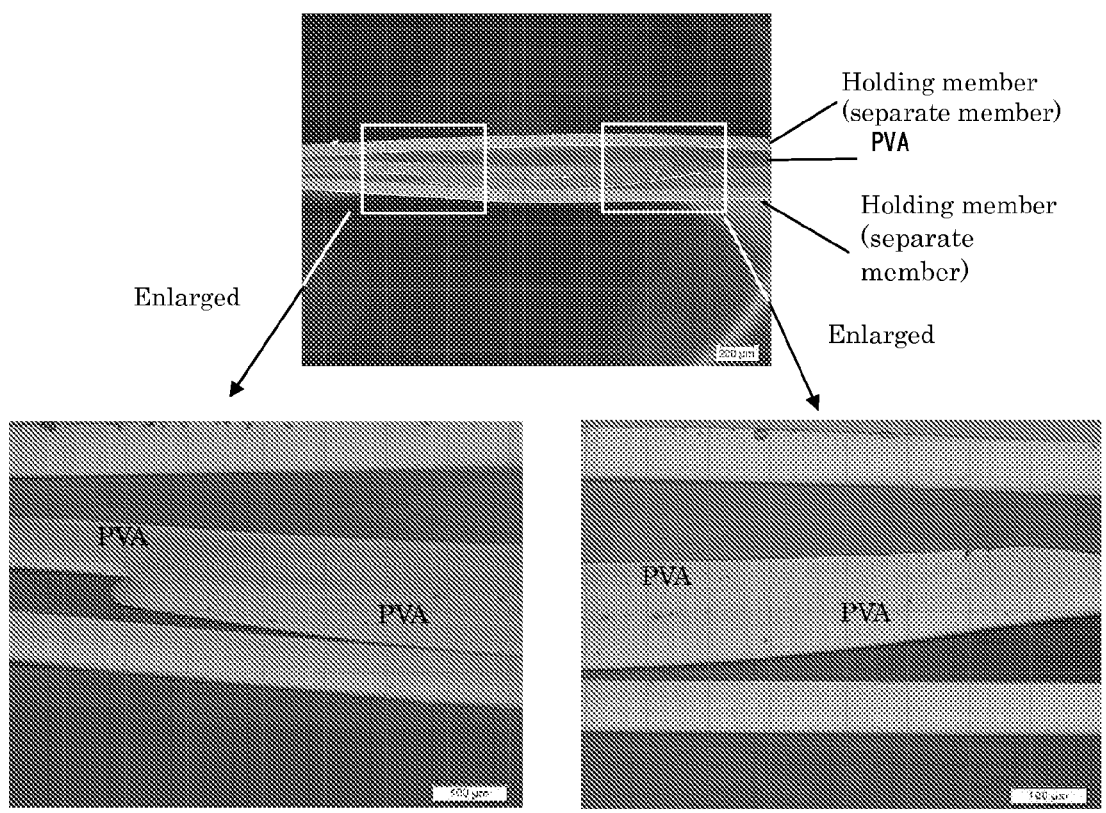
FIG. 5 is a photograph taken by a microscope and showing the state of the joint portion formed in Example 1.

The cross-sectional structure of the joint portion of the bonded raw films was observed with an optical microscope. The result is shown in FIG. 5.

As shown in the Figure, a good bonding state can be found.

Example 2

The old and new raw films were bonded under the basic conditions except that the width of the raw film was changed to 3,900 mm and the laser output was changed to 90 W, and a polarizing film was produced by roll-to-roll. As a result, similarly to the case of Example 1, the joint portion was not broken under the stretching condition of the total accumulated stretch ratio of 6.0 times, and the film could be fed continuously.

Example 3

The old and new raw films were bonded under the basic conditions except that the laser welding was performed at an inclination angle of the bonded portion of the old and new raw films in the transverse direction of 45°, approximately 50 mm of the bonded film on the upstream and downstream sides of the joint portion was cut out in the same manner as in Example 1, and a polarizing film was produced in batch. As a result, the joint portion was not broken under the stretching condition of the total accumulated stretch ratio of 6.2 times.

Comparative Example 1

A polarizing film was produced in the same manner as in Example 1 except that the width of the layered portion of the old and new raw films was 30 mm, a nichrome wire having a width of 3 mm was used to heat seal the layered portion under the heating conditions of 66° C. and 3 seconds, and two linear welded portions were formed in the layered portion under the conditions.

Figure 6:
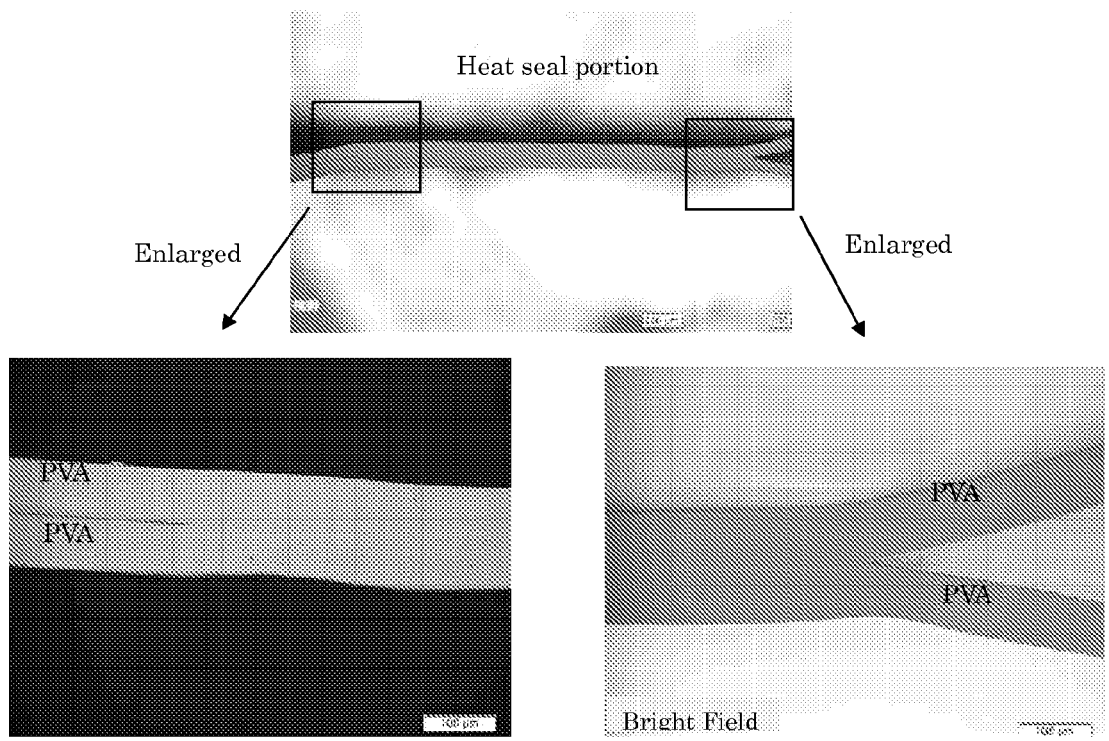
FIG. 6 is a photograph taken by a microscope and showing the state of the joint portion formed in Comparative Example 1.

The state of the joint portion formed at this time was observed with an optical microscope in the same manner as in Example 1. The result is shown in FIG. 6.

As a result, no problem was found in the welding state itself in particular. In the case of Comparative Example 1, however, during production of the polarizing film, the film was broken at the total accumulated stretch ratio of 5.2 times, and could not be stretched to a desired stretch ratio of 6.0 times.

Figure 7:
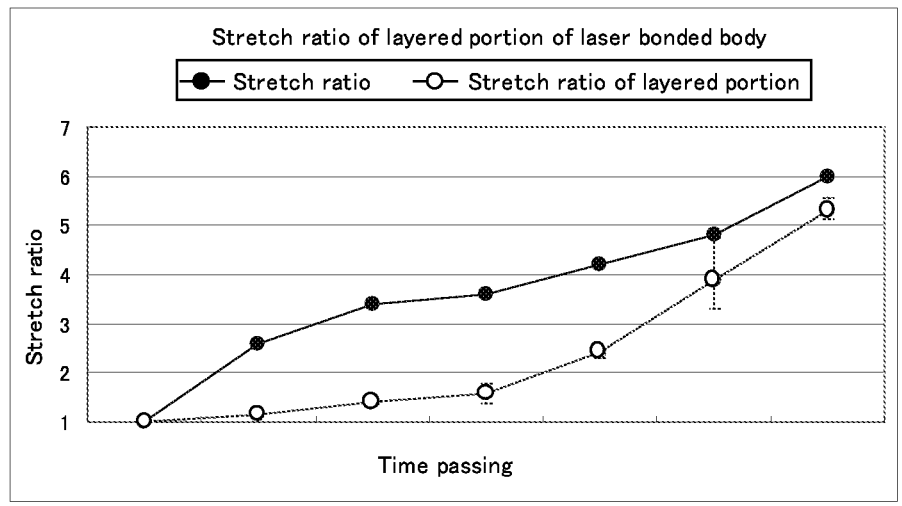
FIG. 7 is a graph showing states of stretching in Example 1 and Comparative Example 1.
Figure 7:
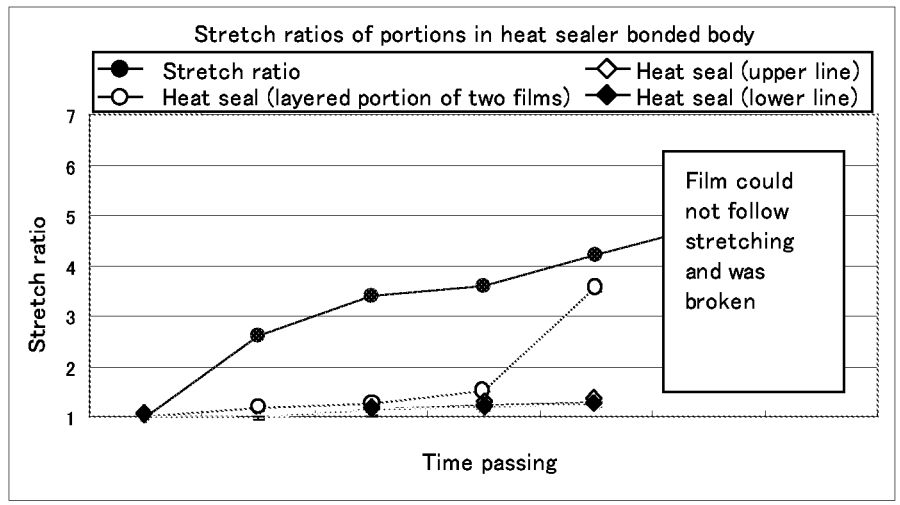

Moreover, the results of measuring the stretch ratio of the entire film and the stretch ratio of the welded portion (layered portion) in Example 1 and Comparative Example 1 as the time passes after start of stretching are shown in FIG. 7.

From the graph shown in the Figure, it also turns out that in the case of Example 1 (the upper graph in FIG. 7), the laser welded portion itself (graph legend "open circle") is stretched in the same manner as the entire film (graph legend "filled circle"), and distortion is difficult to concentrate on the boundary between the laser welded portion and a portion located on the upstream and downstream sides of the laser welded portion and not influenced by heat during the welding.

Meanwhile, in the case of Comparative Example 1 (the lower graph in FIG. 7), the two welded portions (graph legends "open rhombus" and "filled rhombus") are not stretched at all, and only the portion therebetween (graph legend "open circle") is slightly stretched. The film is finally broken.

(Evaluation 2)

The same bonded bodies of the old and new raw films produced in Example 1 and Comparative Example 1 (laser bonded bodies, heat sealer bonded bodies) and a raw film not influenced by heat by bonding (non-modified) were used as a sample. The sample was subjected to a tensile test in water, and the stretch ratio and stress in the sample were measured.

Figure 8:
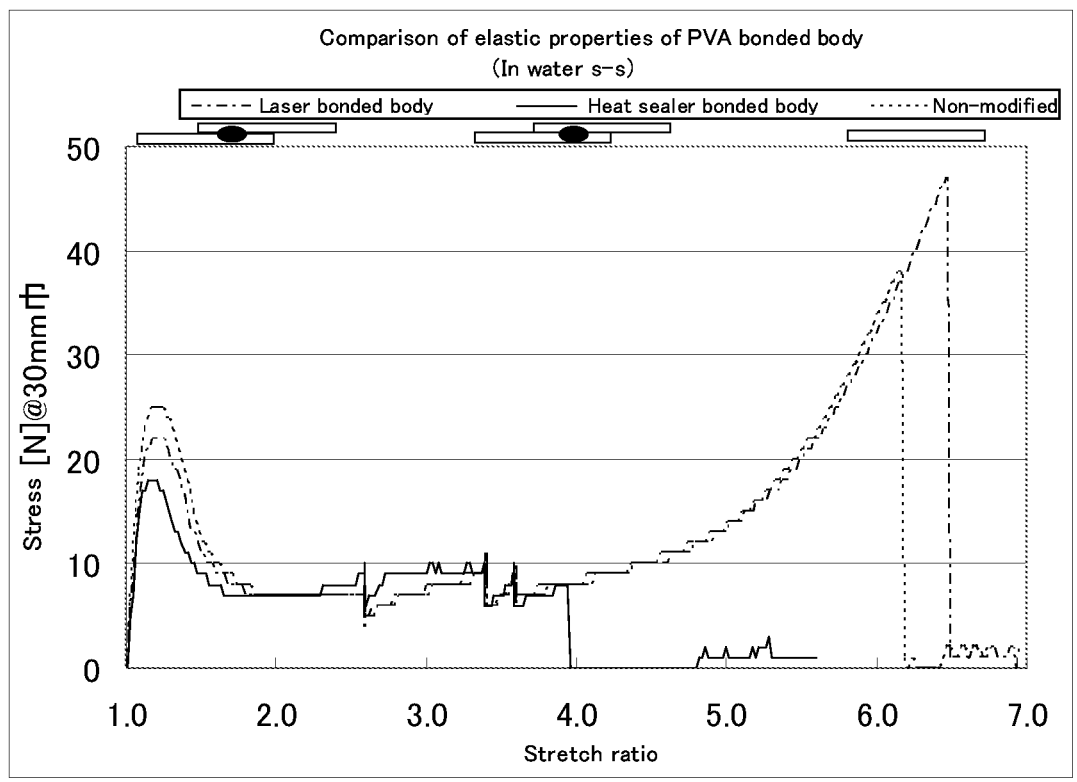
FIG. 8 is a graph showing the difference when a sample of two bonded PVA films is subjected to a tensile test in water.

The result is shown in FIG. 8.

Apparently from the Figure, it could be found that the laser welded film (Example 1: long dashed short dashed line) can be stretched at the same high stretch ratio as that in the PVA film itself not influenced by heat (broken line).

Meanwhile, the film bonded by the heat sealer (Comparative Example 1: solid line) was broken at a stretch ratio approximately 4 times.

As above, according to the present invention, it turns out that a polarizing film having a higher polarizing function can be produced more efficiently than in the case of the process in the related art.

REFERENCE SIGNS LIST

1: raw film (band-like polyvinyl alcohol resin film), 1a: tail end, 1b: leading end, 4f: stretching bath, 9: roller

The invention claimed is:

1. A method of producing a polarizing film, comprising the steps of: at least dyeing and stretching a first polyvinyl alcohol resin film of two or more band-like polyvinyl alcohol resin films in the course of a traveling path while traveling the first polyvinyl alcohol resin film in a longitudinal direction, and bonding a tail end of the first polyvinyl alcohol resin film to a leading end of a second polyvinyl alcohol resin film forming a joint portion, and at least dyeing and stretching the first polyvinyl alcohol resin film, the second polyvinyl alcohol resin film and the joint portion continuously at a stretch ratio of not less than 5.25 times,
    wherein the first and second polyvinyl alcohol resin films are arranged with the tail end of the first polyvinyl alcohol resin film and the leading end of the second polyvinyl alcohol resin film being layered, and an interface portion thereof is bonded to form the joint portion wherein the bonding consists of laser welding and optionally a light absorbing agent.

2. The method of producing a polarizing film according to claim 1, wherein a tail end of the first polyvinyl alcohol resin film not dyed and stretched and a leading end of the second polyvinyl alcohol resin film are arranged to be layered, and an interface portion thereof is laser welded to perform the bonding.

3. The method of producing a polarizing film according to claim 1, wherein the bonding consists of laser welding and the light absorbing agent, and
    wherein the light absorbing agent is applied on the interface portion, and the laser welding is performed.

4. The method of producing a polarizing film according to claim 1, wherein the laser welding is performed with an infrared laser having a wavelength of not less than 800 nm and not more than 11000 nm.

5. The method of producing a polarizing film according to claim 1, wherein the stretch ratio of the first polyvinyl alcohol resin film and the stretch ratio of the second polyvinyl alcohol resin film are not less than 5.5 times.

6. The method of producing a polarizing film according to claim 1, wherein a width of a non-bonded portion in a layered portion of the first and second polyvinyl alcohol resin films is less than 5 mm.

7. The method of producing a polarizing film according to claim 1, wherein a power density of a laser light for irradiation is in the range of 200 $W/cm^2$ to 10,000 $W/cm^2$ in the laser welding.

8. The method of producing a polarizing film according to claim 3, wherein the light absorbing agent is applied to at least one of a surface of the tail end and the leading end at the interface portion.

9. The method of producing a polarizing film according to claim 3, wherein the light absorbing agent is applied to a surface of the tail end and the leading end at the interface portion.

10. The method of producing a polarizing film according to claim 3, wherein the light absorbing agent is selected from the group consisting carbon black, pigments and dyes.

11. The method of producing a polarizing film according to claim 10, wherein the light absorbing agent is selected from the group consisting of phthalocyanine absorbing agents, naphthalocyanine absorbing agents, polymethine absorbing agents, diphenylmethane absorbing agents, triphenylmethane absorbing agents, quinone absorbing agents, azo absorbing agents, and diimmonium salts.

* * * * *